A. B. FERDINAND.
DRAFT REGULATOR.
APPLICATION FILED FEB. 8, 1912.
1,218,990.
Patented Mar. 13, 1917.
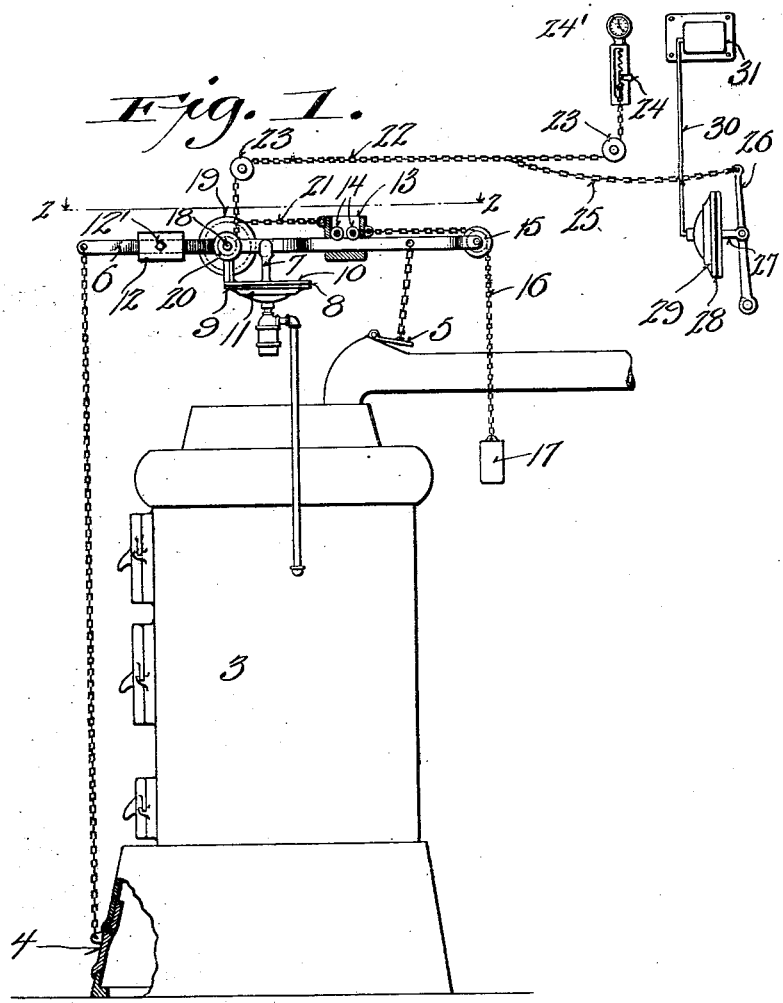
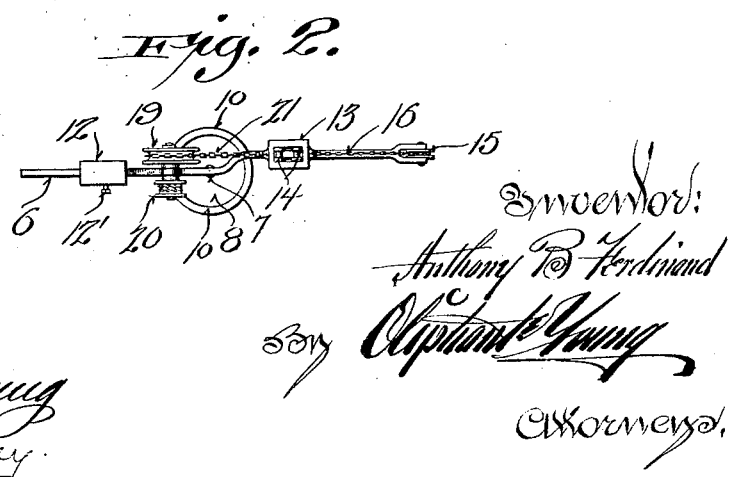

UNITED STATES PATENT OFFICE.

ANTHONY B. FERDINAND, OF WAUWATOSA, WISCONSIN.

DRAFT-REGULATOR.

1,218,990.  Specification of Letters Patent.  Patented Mar. 13, 1917.

Application filed February 8, 1912. Serial No. 676,298.

*To all whom it may concern:*

Be it known that I, ANTHONY B. FERDINAND, a citizen of the United States, and resident of Wauwatosa, in the county of Milwaukee and State of Wisconsin, have invented certain new and useful Improvements in Draft-Regulators; and I do hereby declare that the following is a full, clear, and exact description thereof.

My invention consists in what is herein particularly set forth with reference to the accompanying drawings and pointed out in the claims of this specification, its object being to provide for effecting manual and automatic adjustments of the governors of heating-apparatus damper-regulators at a distance therefrom.

Figure 1 of the drawings represents a side elevation of a water-boiler provided with a damper regulator having the governor manually and automatically adjustable by means located distant therefrom, said governor being shown in section, and Fig. 2, a plan view of said regulator and its governor adjusting mechanism partly in horizontal section, the view being indicated by line 2—2 in Fig. 1.

Referring by numerals to the drawings, 3 indicates the boiler of a hot-water heating apparatus, 4 its draft-damper and 5 its check-damper, these dampers being in chain-connection with the lever 6 of a regulator applied to said heating-apparatus. Various means may be employed for tilting the lever at a predetermined degree of temperature in the heating-apparatus to close the draft-damper and open the check-damper, or said lever may be employed in connection with the draft-damper only, as some times occurs. As a mere matter of illustration, the lever is shown shackled to the stem 7 of an expansible diaphragm 8 and fulcrumed in connection with a post 9 rising from a ring 10 between which and a cup 11 the diaphragm is secured, provision being had for expanding said diaphragm by fluid-pressure when the temperature in the heating-apparatus attains a predetermined degree as is customary practice. In Fig. 1, the lever 6 is shown tilted to permit closing of the draft-damper and to cause an opening of the check-damper of the heating apparatus.

In one direction from its fulcrum, the lever 6 is shown provided with an adjustable counterweight 12, made fast in its adjusted position by a set-screw 12', and in sliding engagement with said lever in the opposite direction from said fulcrum is a governor 13, preferably provided with anti-friction rollers 14 for which the aforesaid lever serves as a track. Journaled in a forked end of the lever is a sheave 15 for a chain 16 or other suitable flexible device connecting the sliding governor and a pull-weight 17 to facilitate movement of said governor in one direction, but the same result may be variously attained.

The fulcrum of the lever 6 is a spindle 18, and fast on the spindle are drums 19 and 20 for the winding and unwinding of chains 21, 22 or other suitable flexible devices. The flexible device 21 is coupled to the governor 13, and the flexible device 22 is trained on suitably arranged sheaves 23 to run to a station distant from the damper-regulator, say into an apartment above the one in which the heating apparatus is located, where it may be put in connection with any suitable fixture to determine the adjustment of said governor upon said lever. It is preferable, as herein shown, to connect the flexible device 22 with the adjustable slide 24 of a time draft-regulator similar to the one set forth in my Letters Patent No. 798,771, granted September 5, 1905, its clock for effecting automatic release of the adjusted slide being shown at 24'.

By pull of the flexible device 22, the governor 13 of the damper-regulator is moved toward the fulcrum of the lever 6 upon which it is supported, and a letting out of said flexible device will result in said governor moving in the opposite direction, its position on said lever determining the pressure or degree of temperature in the heating apparatus at which the lever-tilting means will become effective for the purpose specified.

A flexible device 25 is shown coupled to the one 22 and connected to a lever 26 in shackle-connection with the stem 27 of another expansible diaphragm 28, having the cup 29 therewith in pipe connection 30 with an expansible fluid container 31 located distant from draft-regulator, say in the apartment where it is designed to have said flexible device 22 manipulated. Now if the governor 13 is at its full limit of outward adjustment upon the lever 6, and the temperature in the aforesaid apartment rises above a predetermined degree, there will be an expansion of the fluid in the container 31 to effect an operation of the lever 26 and thereby cause an inward movement of said governor to offer less resistance to the action of the main diaphragm or its equivalent means for effecting a tilt of the main lever to a position that will permit closing of the draft-damper and an opening of the check-damper, if the latter damper be in connection with said main lever, a reverse operation being the result upon contraction of the fluid in said container.

From the foregoing, it will be understood that the governor 13 is movable lengthwise of a tilting lever, in either direction, and that said governor is under control, in the matter of adjustments, at a station distant therefrom. It is also to be noted that the adjustments of the governor are independent of the tilt of the lever and that said governor remains in each adjusted position regardless of the disposition of said lever on its fulcrum, this being an important feature of my invention.

I claim:

1. A heating-apparatus damper-regulator lever and means controlling tilt of the same coincidental to fluctuations of pressure or temperature in the apparatus, a spindle upon which the lever is fulcrumed, a pair of drums fast on the spindle, a governor slidable on the lever, a flexible device connecting the governor with one of the drums, a similar device leading from the other drum to a station distant from the heating apparatus, means for adjustably supporting the latter flexible device at said distant station, a pull-weight, and a flexible hanger for the weight guided in connection with the lever and attached to said governor, the draw of the weight being opposite the aforesaid flexible device in connection with said governor and the independent adjustment of the governor on said lever serving to determine the degree of pressure or temperature at which the lever-tilting means may become effective.

2. A regulator comprising a pivotally mounted lever, a governor slidably connected thereto, means for slidably moving the governor in one direction on the lever, locking means for preventing reverse movement of the governor, means for releasing the locking means, and means opposing movement of the governor by the first mentioned means and adapted to move the governor in an opposite direction when the actuating means are inactive and the locking means are released.

3. A regulator comprising a lever, a thermally actuated motor, a governor slidably mounted on the lever and adapted to be moved in one direction thereon by said motor, locking means for preventing reverse movement of the governor but permitting advancing movement of the governor by said motor, and means opposing movement of the governor by the motor and for reversing the movement of the governor when the locking means are released and the motor not acting on the governor.

4. A regulator comprising an intermediately pivoted control lever, a governor weight slidably mounted on the lever at one side of its pivot, automatic mechanism for moving the governor weight in one direction on the lever, automatically acting means opposing movement of the governor by the said automatic mechanism and adapted to move said governor in an opposite direction and an adjustable weight on the other side of the lever.

In testimony that I claim the foregoing I have hereunto set my hand at Milwaukee, in the county of Milwaukee and State of Wisconsin in the presence of two witnesses.

ANTHONY B. FERDINAND.

Witnesses:
N. E. OLIPHANT,
M. E. DOWNEY.